United States Patent
Lin

(10) Patent No.: US 10,330,296 B1
(45) Date of Patent: Jun. 25, 2019

(54) MULTI-ANGLE OUTDOOR PROJECTION DEVICE

(71) Applicant: Chia-Hua Lin, New Taipei (TW)

(72) Inventor: Chia-Hua Lin, New Taipei (TW)

(*) Notice: Subject to any disclaimer, the term of this patent is extended or adjusted under 35 U.S.C. 154(b) by 0 days.

(21) Appl. No.: 16/111,290

(22) Filed: Aug. 24, 2018

(51) Int. Cl.
  *F21W 131/10* (2006.01)
  *F21V 21/30* (2006.01)
  *F21V 31/00* (2006.01)
  *F21V 21/08* (2006.01)

(52) U.S. Cl.
  CPC .......... *F21V 21/30* (2013.01); *F21V 21/0824* (2013.01); *F21V 31/005* (2013.01); *F21W 2131/10* (2013.01)

(58) Field of Classification Search
  CPC ......... G02F 1/133603; G02F 1/133514; G02F 2001/133614; G02F 2202/36; F21V 21/28; F21V 21/30; F21V 21/0824; F21V 31/005; F21Y 2115/10; F21W 2131/40; F21W 2131/109; F21W 2131/107; F21W 2131/10; F21W 2131/406
  See application file for complete search history.

(56) References Cited

U.S. PATENT DOCUMENTS

| | | | |
|---|---|---|---|
| 2,147,953 A * | 2/1939 | Tornblom | B60R 16/005 200/332.2 |
| 3,377,473 A * | 4/1968 | Breeding | F21V 17/12 362/294 |
| 5,140,507 A * | 8/1992 | Harwood | F21S 8/038 248/278.1 |
| 8,030,630 B2 * | 10/2011 | Tan | G06K 7/10732 235/41 |
| 2003/0063380 A1 * | 4/2003 | Hirunuma | G02B 7/06 359/407 |
| 2015/0219903 A1 * | 8/2015 | Chien | G02B 27/08 353/1 |
| 2017/0167695 A1 * | 6/2017 | Erdener | H05B 33/0845 |
| 2017/0276337 A1 * | 9/2017 | Thomas | F21V 23/009 |

* cited by examiner

*Primary Examiner* — Anh T Mai
*Assistant Examiner* — Fatima N Farokhrooz
(74) *Attorney, Agent, or Firm* — WPAT, PC

(57) ABSTRACT

A multi-angle outdoor projection device comprises a fixing frame, an exterior case and a projection assembly, wherein the fixing frame includes a ground cone for insertions into outdoor ground, and the exterior case can be combined with the fixing frame and has a main case body which is internally formed with a combination seat; also, the projection assembly has an electric circuit board which is assembled onto the assembly seat and has a lamp seat thereon, and at least two projection tubes are installed on the lateral side of the lamp seat corresponding to the opening, with each projection tube being installed on the lamp seat in an outward and radial fashion such that each projection tube can project towards different directions thereby achieving the effect of simultaneously providing two or more image projections.

8 Claims, 11 Drawing Sheets

MULTI-ANGLE OUTDOOR PROJECTION DEVICE

BACKGROUND OF THE INVENTION

1. Field of the Invention

The present invention generally relates to a multi-angle outdoor projection device featuring fixed insertions into outdoor ground in order to provide image projections; in particular, it relates to a projection device capable of simultaneously providing two or more image projections.

2. Description of Related Art

It is known that most of currently available projection devices enable projections of single images, whose internal configurations usually include various elements such as a set of illumination components, projection image films and lenses etc., and project the images of the placed projection image films to a designated position by means of the illumination components through these lenses. Integrally speaking, this type of single image at a single angle is quite tedious, lacking versatility, and in case that multiple images are to be projected at the same time, it further requires to simultaneously utilize multiple projection devices, accordingly resulting in higher costs.

In addition, most projection devices are typically equipped with a tripod suitable for placement on a tabletop, or a bracket for locking on a wall or ceiling. They may be applicable for indoor installations or setups, but not truly adequate for outdoor fixed uses, especially on a soft ground containing such as dirt, gravels, sands or the like, where no appropriate fixation structure for providing supports in operation.

Therefore, the present invention has made improvements on the projection lamp, in conjunction with an internal circuit board, thereby increasing the number of lamps for projections such that a single body can project at least two or more images in order to offer more diverse image combinations and changes. Besides, it is further combined with a fixing frame for fixed installations in outdoor use so as to achieve the effect of outdoor applications. As such, especially with respect to outdoor activities and festivals, it is possible to project rich and fantastic images to enhance the atmosphere of activities and celebrations by using the projection lamp of the present invention, which offers practical value in practice.

SUMMARY OF THE INVENTION

A multi-angle outdoor projection device according to the present invention comprises a fixing frame, an exterior case and a projection assembly, wherein the fixing frame includes a ground cone which has a treadle formed thereon, and the top of the treadle is further fixedly configured with a first gear disc having massive first gear teeth; the exterior case includes a main case body which is fixedly configured with a second gear disc, and massive second gear teeth are formed on the second gear disc, in which the second gear disc is used to pivotally connect to the first gear disc thereby allowing the second gear teeth to closely mesh with the first gear teeth, and a combination seat is formed within the main case body having an opening, a combination groove is formed on the edge of the opening and can be applied for the assemblage of a transparent projection cover; and the projection assembly includes an electric circuit board which is assembled on the combination seat and has a lamp seat thereon, and at least two projection tubes are installed on the lateral side of the lamp seat corresponding the opening, in which each projection tube is set up on the lamp seat in an outward and radial fashion such that each projection tube may project towards different directions; as such, since there are two projection tubes in the configuration, the projection films placed inside each projection tube can include corresponding images; e.g., continuous images of coherent motions, thereby providing more diverse image combinations and variations; moreover, the ground cone can be applied to insert into various types of soft grounds consisting of mud, peddles and sands or the like, and, by treading the treadle, it is possible to push the ground cone into the ground to a certain predetermined depth so as to fix it to the outdoor ground and facilitate image projections onto an appropriate wall, thus achieving the effect of fixed outdoor applications.

More specifically, the ground cone is tapered.

More specifically, the second gear disc is fixedly installed under the main case body.

More specifically, the first gear teeth and the second gear teeth are ratchet teeth.

More specifically, the first gear teeth are ring-wise arranged on the first gear disc, and the second gear teeth are ring-wise arranged on the second gear disc.

More specifically, a waterproof ring is installed between the projection cover and the combination groove.

More specifically, the projection cover is separately configured with an inner cover case and an outer cover case, the waterproof ring is located between the inner cover case and the combination groove, and the outer cover case is fixed in snap to the outside of the inner cover case.

More specifically, the inside of each projection tube is sequentially towards the outside installed with a projection lamp, a first lens, a projection film and a second lens.

More specifically, a supporting frame is respectively installed on the other end of each projection tube in opposition to the lamp seat, and is fixedly embedded to the electric circuit board; also, the electric circuit board is openly configured with plural notches whose quantity corresponds to the number of the supporting frames, such that each of the supporting frames can be embedded fixedly into each of the notches in the electric circuit board.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
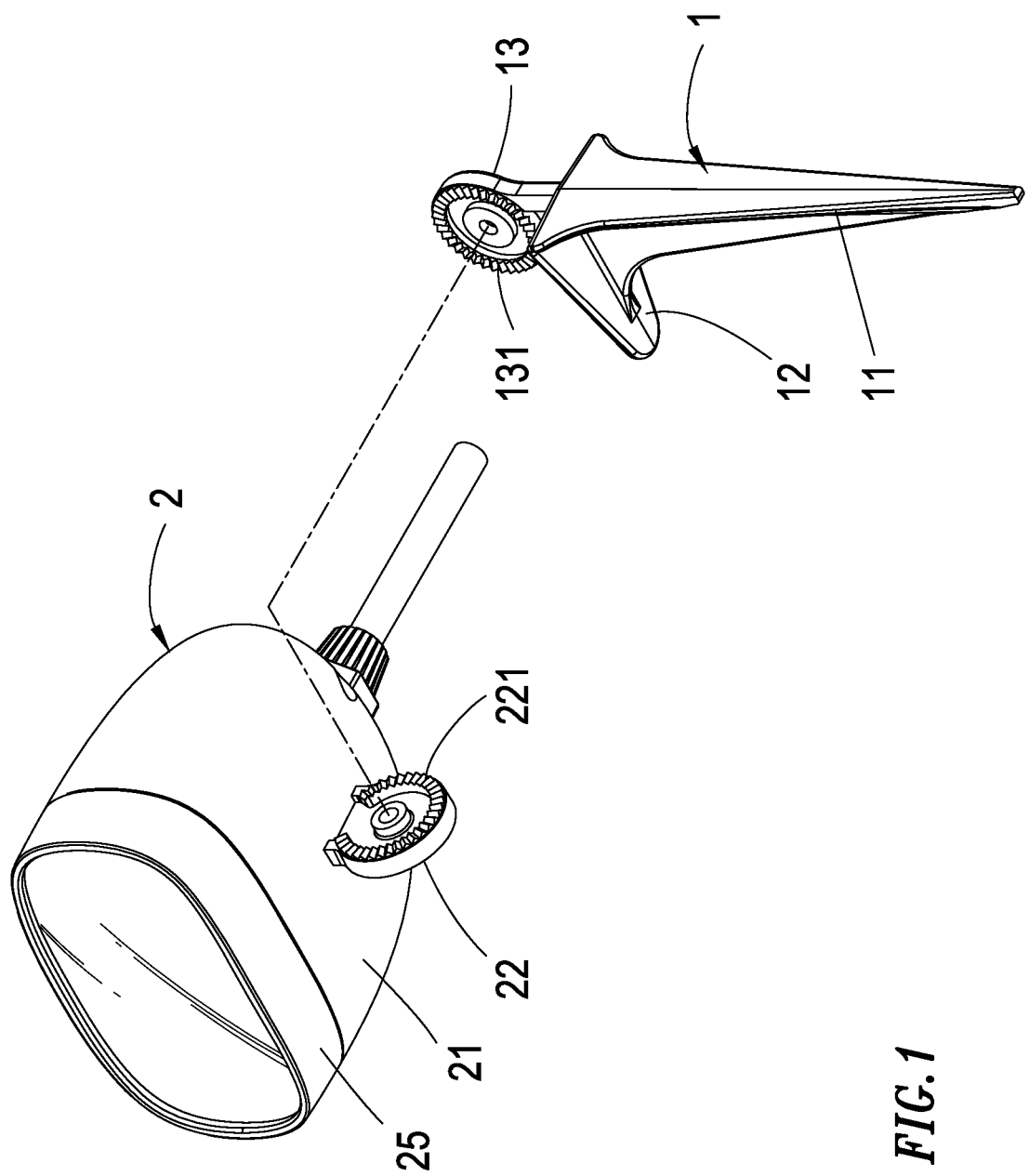
FIG. 1 shows a stereo disassembled view of the multi-angle outdoor projection device according to the present invention.
Figure 2:
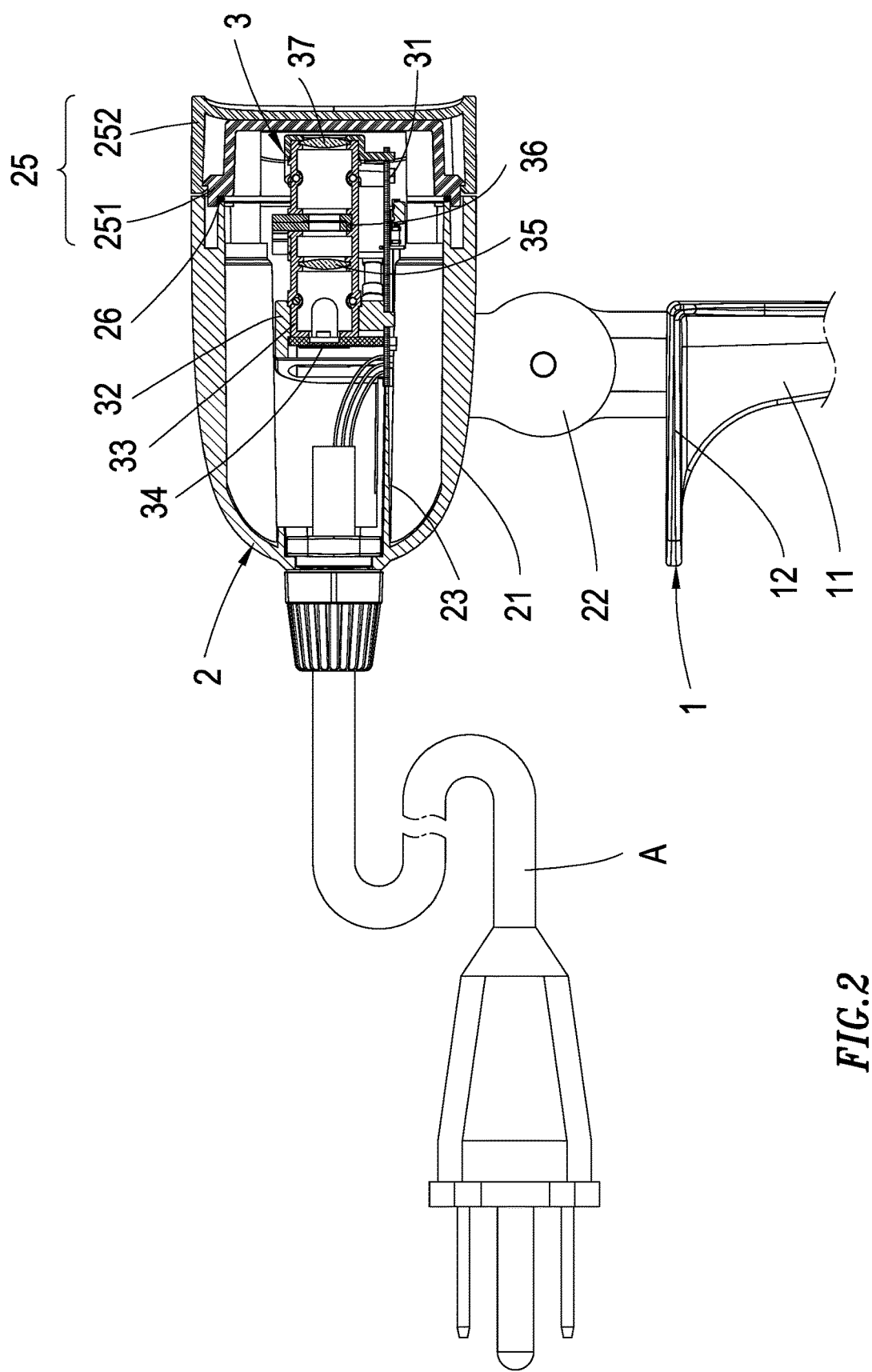
FIG. 2 shows a structural cross-sectioned view of the multi-angle outdoor projection device according to the present invention.

Refer first to FIGS. 1, 2, wherein a stereo disassembled view and an internally structural cross-sectioned view of a multi-angle outdoor projection device according to the present invention are respectively shown. As described in the Figures, it comprises a fixing frame 1, an exterior case 2 and a projection assembly 3.

Herein the fixing frame 1 includes a ground cone 11 which has a treadle 12 formed thereon, and the top of the treadle 12 is further fixedly configured with a first gear disc 13 having massive and ring-wise arranged first gear teeth 131.

Additionally, the exterior case 2 includes a main case body 21, a second gear disc 22 is fixedly installed under the main case body 21 and also has massive ring-wise arranged second gear teeth 221 thereon, in which the second gear disc 22 is used to pivotally connect to the first gear disc 13 such that the second gear teeth 221 closely mesh with the first gear teeth 131. In the present embodiment, the first gear teeth 131 and the second gear teeth 221 are configured as ratchet teeth in order to facilitate the direct twist angle upon meshing. A combination seat 23 is formed inside the main case body 21 for assembling the projection assembly 3, the main case body 21 includes an opening 211, a combination groove 24 is formed at the edge of the opening 211 and used to assemble a transparent projection cover 25, and also a waterproof ring 26 is set up between the projection cover 25 and the combination groove 24. Besides, in the present embodiment, the projection cover 25 is further separately configured with an inner cover case 251 and an outer cover case 252, and the waterproof ring 26 is placed between the inner cover case 251 and the combination groove 24, while the outer cover case 252 is fixed in snap outside the inner cover case 251.

Figure 3:
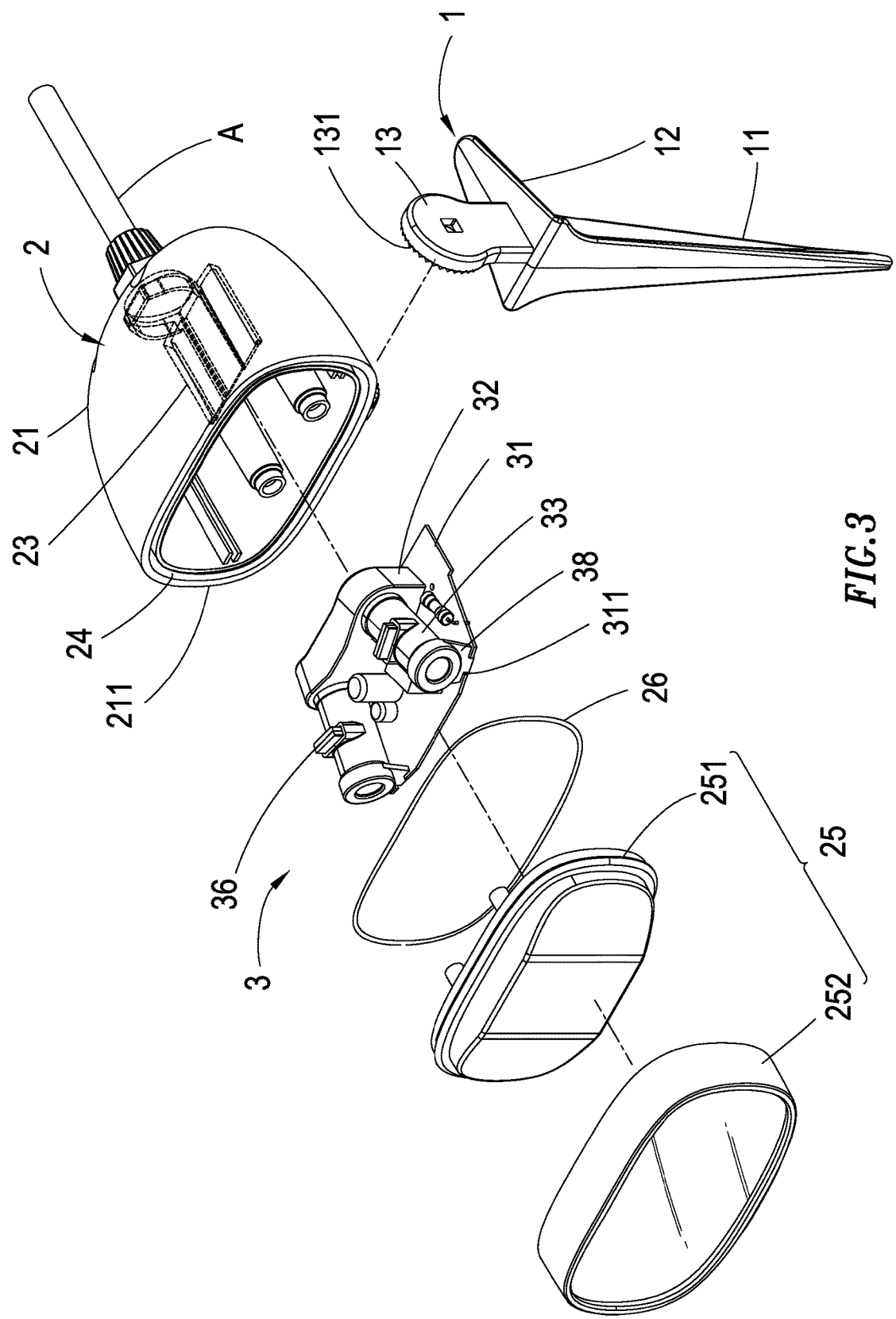
FIG. 3 shows a stereo disassembled view for a first embodiment of the multi-angle outdoor projection device according to the present invention.
Figure 4:
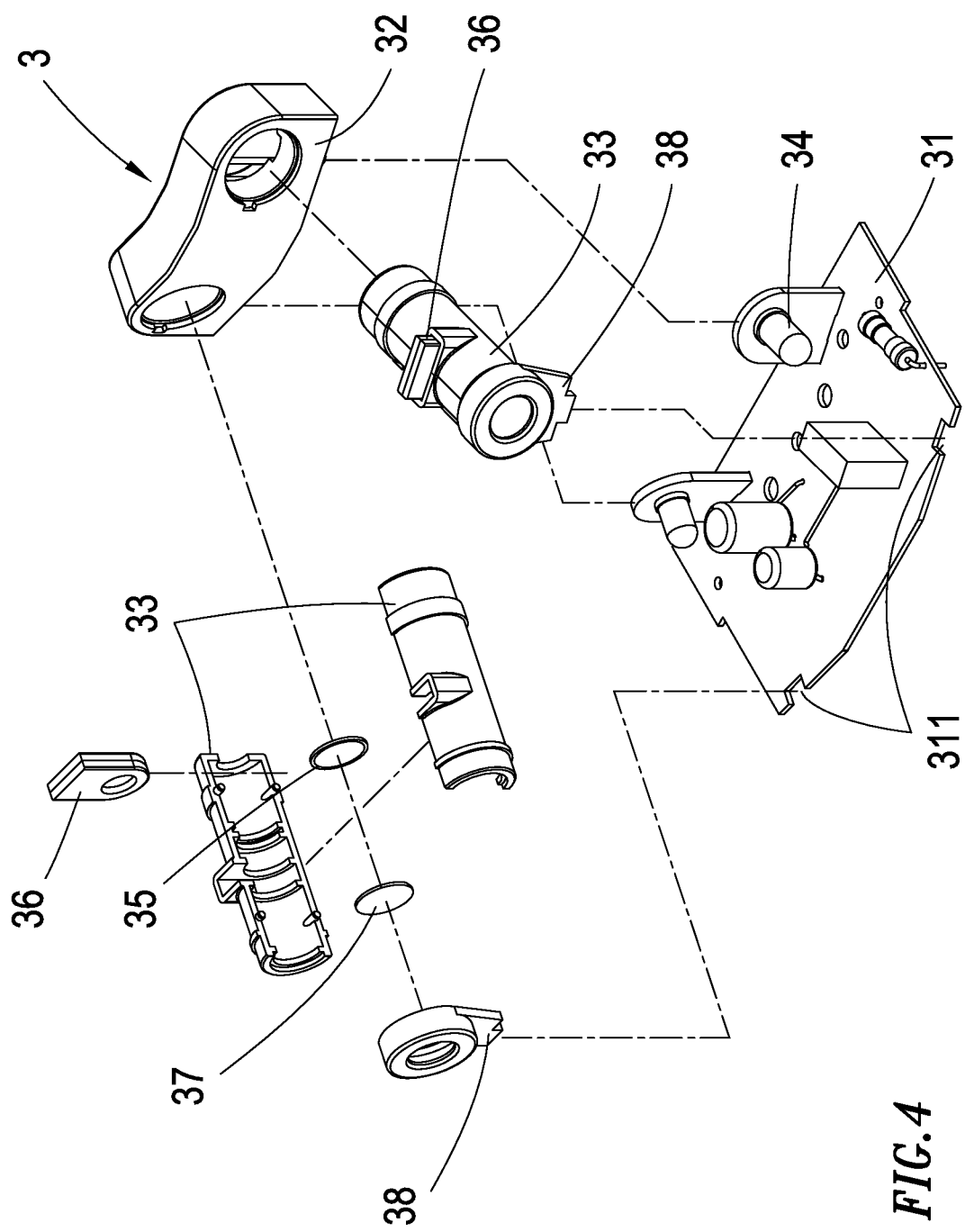
FIG. 4 shows a stereo disassembled view of the projection assembly in the multi-angle outdoor projection device according to the present invention.
Figure 5:
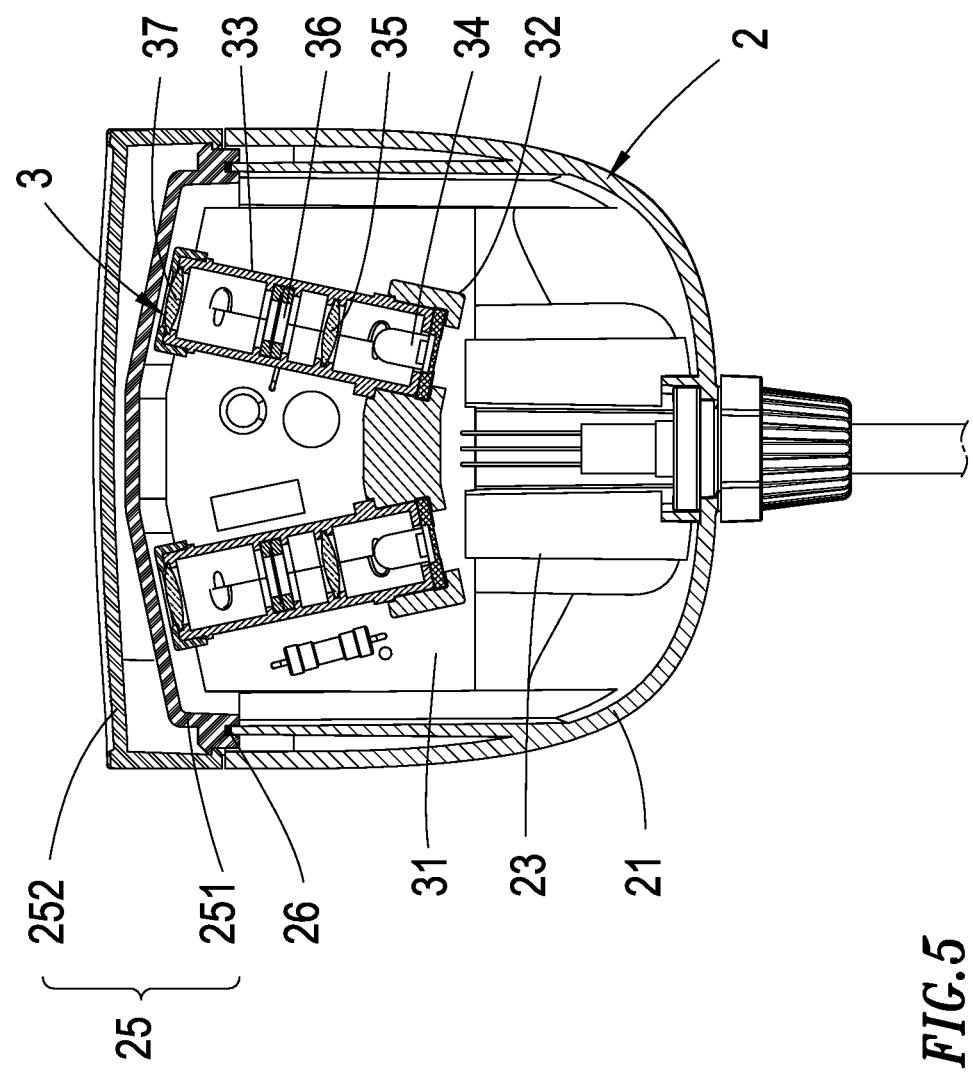
FIG. 5 shows a structural cross-sectioned view for the first embodiment of the multi-angle outdoor projection device according to the present invention.
Figure 6:
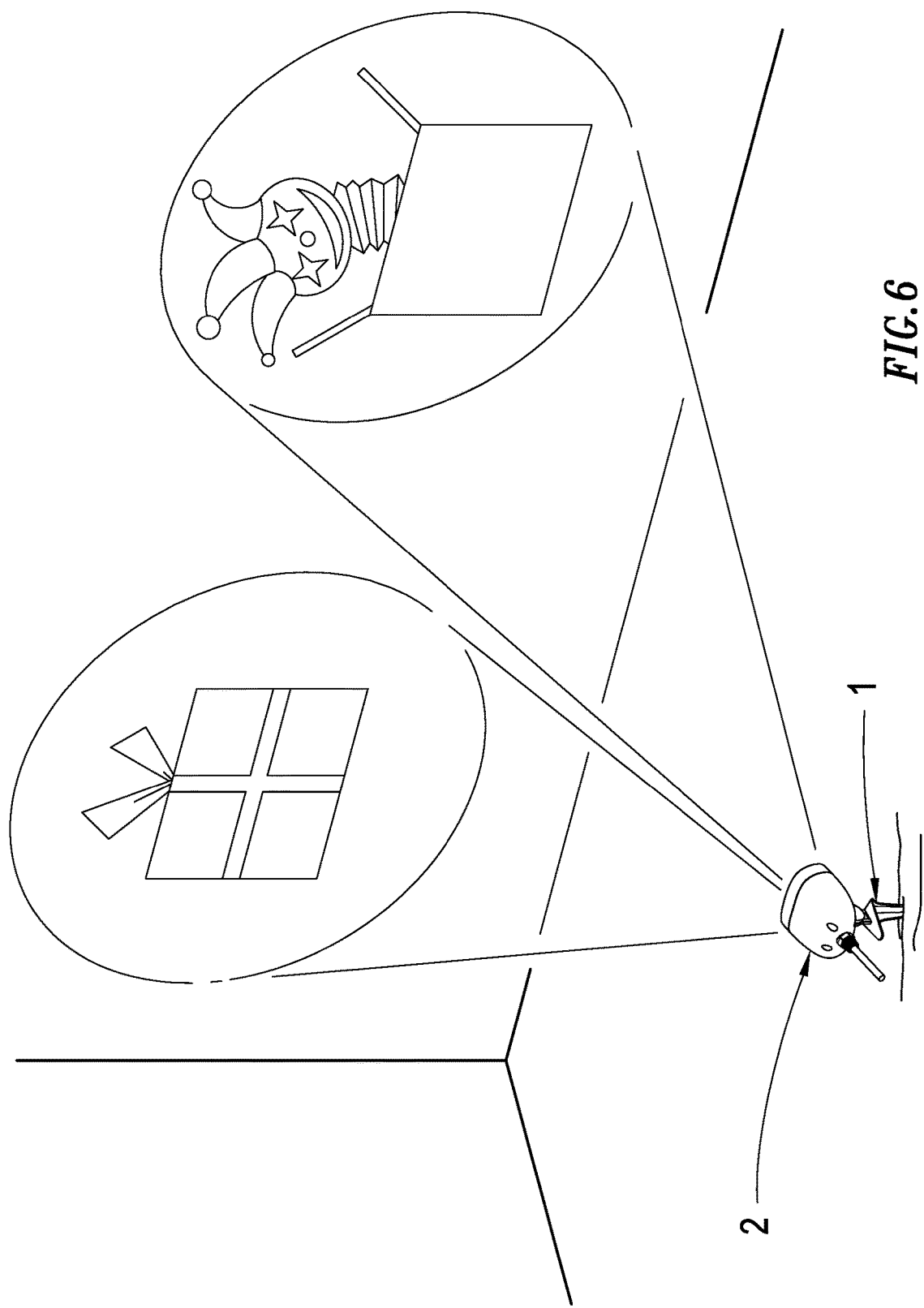
FIG. 6 shows a stereo implementation view for the first embodiment of the multi-angle outdoor projection device according to the present invention.

Moreover, the projection assembly 3 includes an electric circuit board 31 which is installed on the combination seat 23 and electrically connected to a power plug A to provide required electric power. Next, refer conjunctively to FIGS. 3-5, wherein a lamp seat 32 is set up on the electric circuit board 31, and at least two projection tubes 33 are installed on the lateral side of the lamp seat 32 corresponding to the opening 211, with the inside of each projection tube 33 being sequentially towards the outside installed with a projection lamp 34, a first lens 35, a projection film 36 and a second lens 37, and each projection tube 33 being installed on the lamp seat 32 in an outward and radial fashion such that each projection tube 33 may project towards different directions. Furthermore, a supporting frame 38 is respectively installed on the other end of each projection tube 33 in opposition to the lamp seat 32, and is fixedly embedded to the electric circuit board 31; in addition, the electric circuit board 31 is openly configured with plural notches 311 whose quantity corresponds to the number of the supporting frames 38, such that each of the supporting frames 38 can be embedded fixedly into each of the notches 311 in the electric circuit board 31.

Subsequently, referring to FIGS. 3-6, a multi-angle outdoor projection device according to the present invention is shown. In this embodiment, two projection tubes 33 are installed, and, after connecting the power plug A to a power source, the projection lamp 34 emits light to the first lens 35 which transfers the incident light to the projecting film 36 so that the image on the projection film 36 can be further projected onto the second lens 37, travelling through the second lens 37, then finally projected onto an assigned location. Seeing that there are two projection tubes 33 set up therein, the projection film 36 in each projection tube 33 may respectively have a corresponding image; e.g., continuous images of coherent motions.

Figure 7:
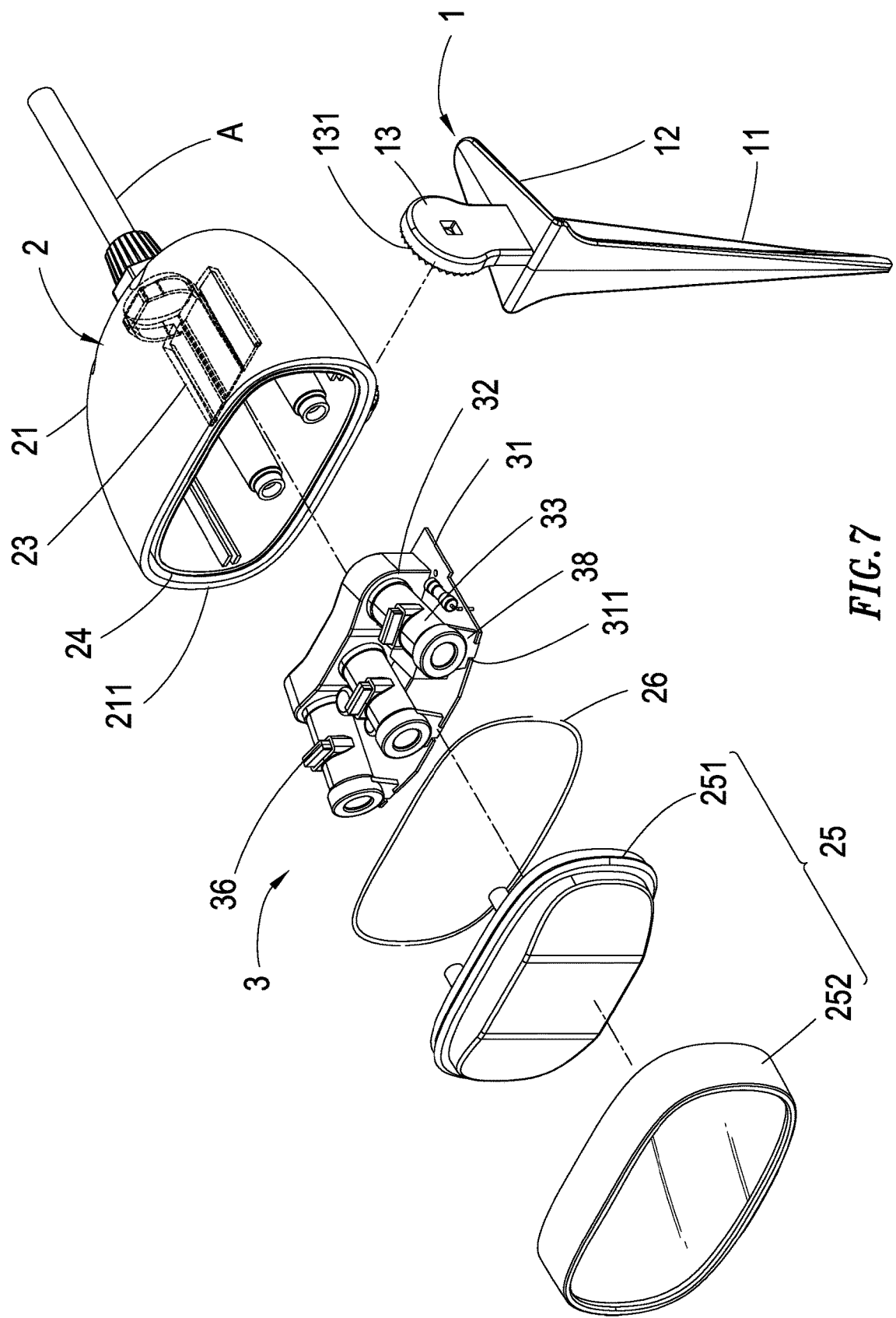
FIG. 7 shows a stereo disassembled view for a second embodiment of the multi-angle outdoor projection device according to the present invention.
Figure 8:
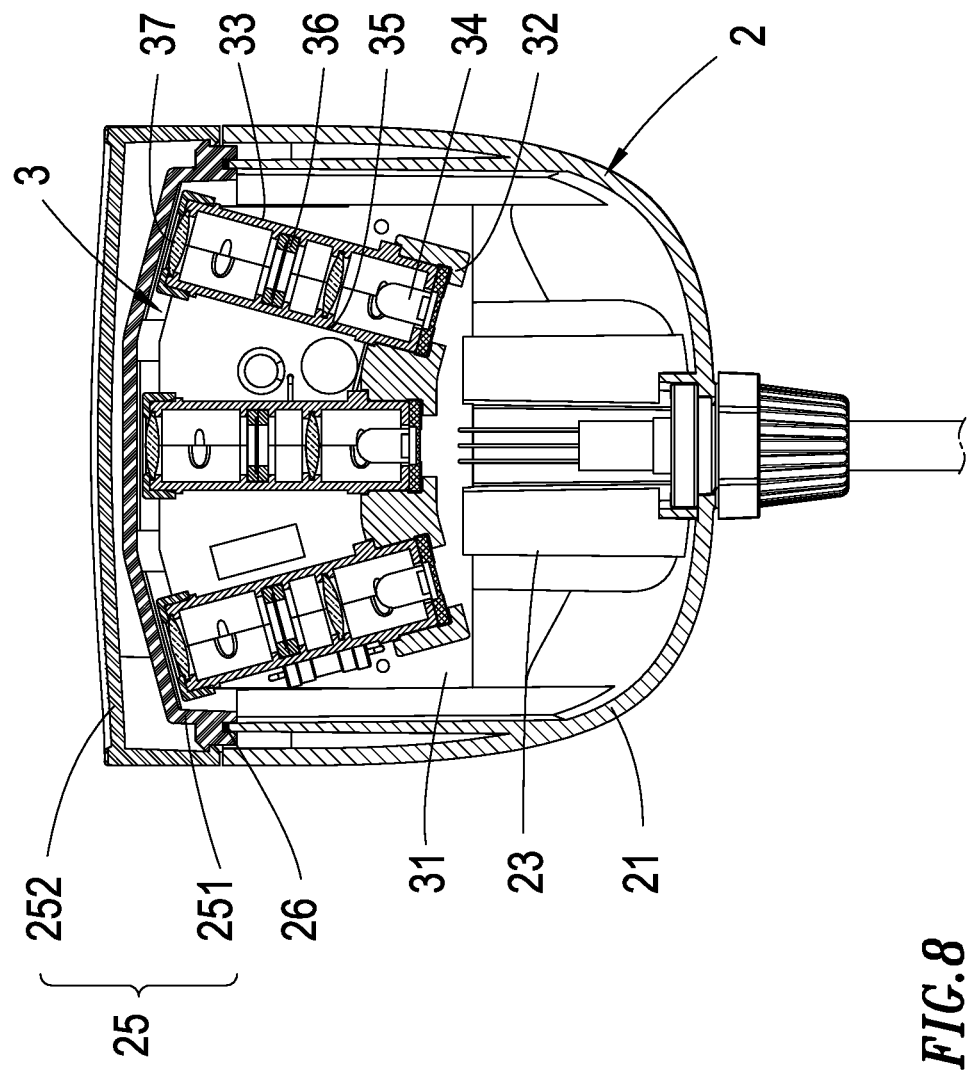
FIG. 8 shows a structural cross-sectioned view for the second embodiment of the multi-angle outdoor projection device according to the present invention.
Figure 9:
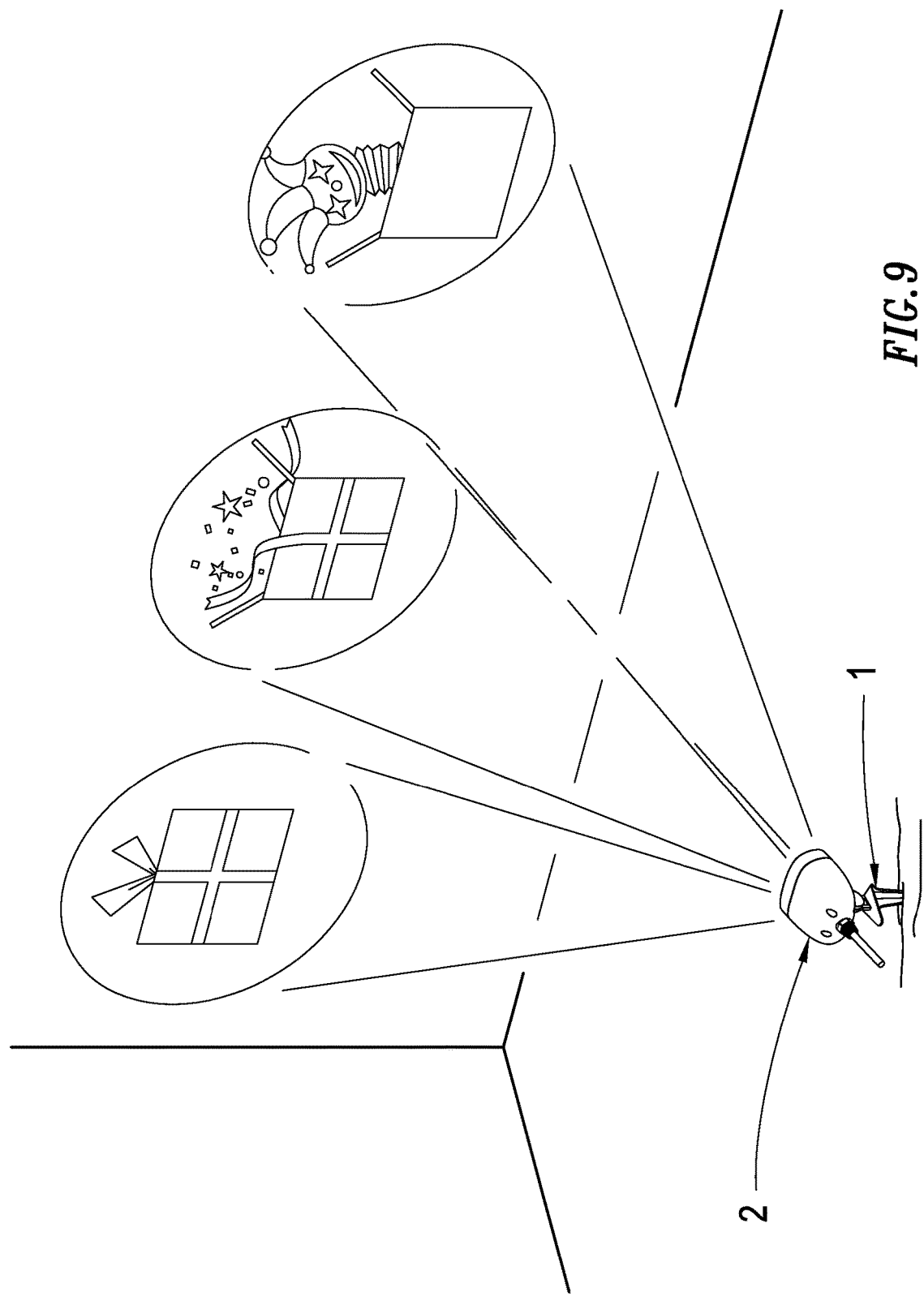
FIG. 9 shows a stereo implementation view for the second embodiment of the multi-angle outdoor projection device according to the present invention.

Following this, referring to FIGS. 7-9, another multi-angle outdoor projection device according to the present invention is shown. Comparatively, there install three projection tubes 33 in this embodiment. It can be understood that, similarly, the projection film 36 in each projection tube 33 may respectively have a corresponding image thereby enabling more diverse image combinations and variations; in an analogous fashion, more projection tubes 33 can be additionally installed in practice so as to fulfill various application demands.

Figure 10:
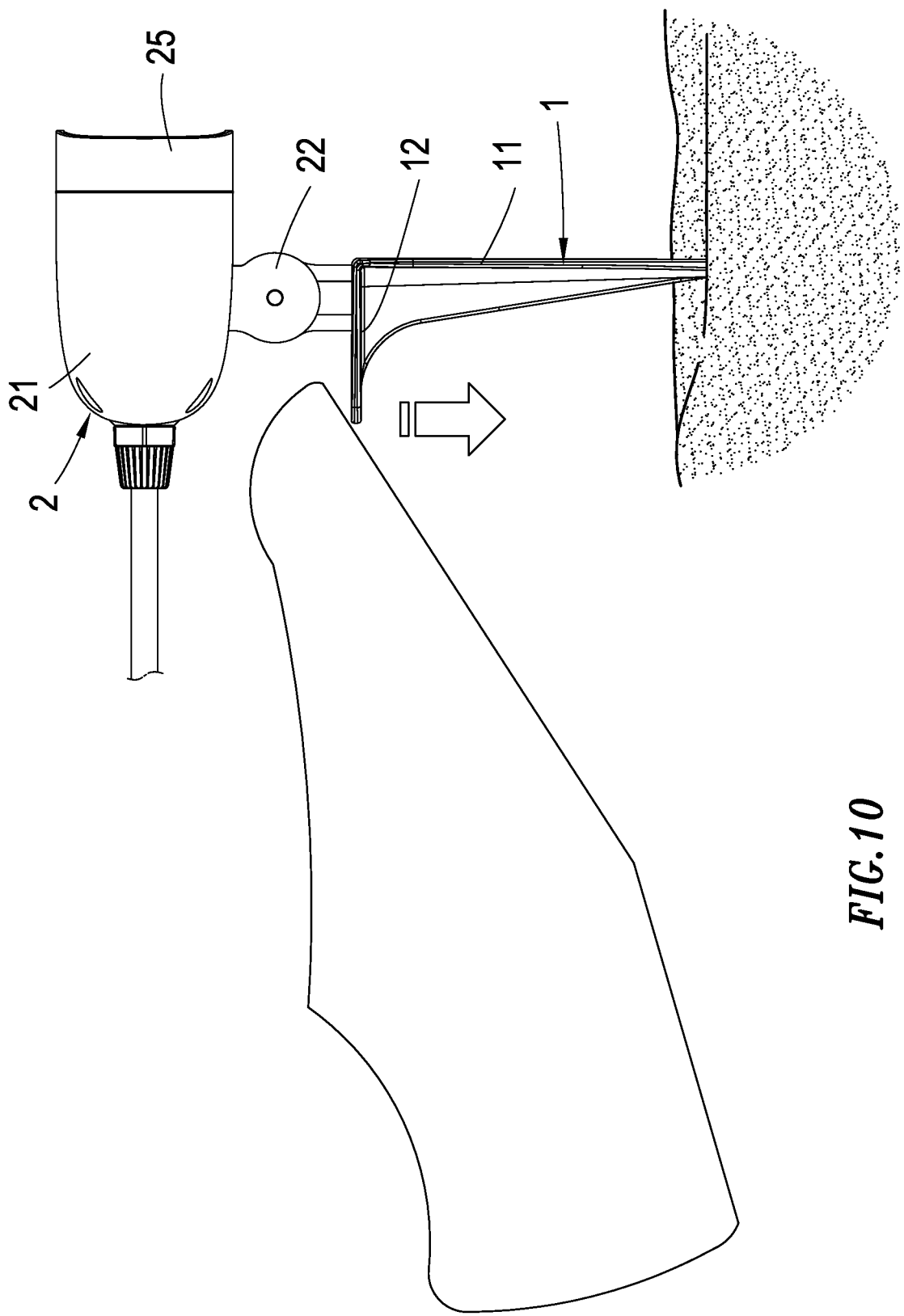
FIG. 10 shows an implementation view for an outdoor ground application of the multi-angle outdoor projection device according to the present invention.

Referring to FIG. 10, it can be appreciated that the multi-angle outdoor projection device according to the present invention is suitable for outdoor applications, in which the tapered tip of the ground cone 11 is designed to be inserted into soft outdoor ground containing mud, stones, sand or the like, and, by way of treading on the treadle 12 to push the ground cone 11 into the ground to a certain predetermined depth, the device can be fixedly set up on the outdoor ground thereby allowing to project the image onto a corresponding wall.

Figure 11:
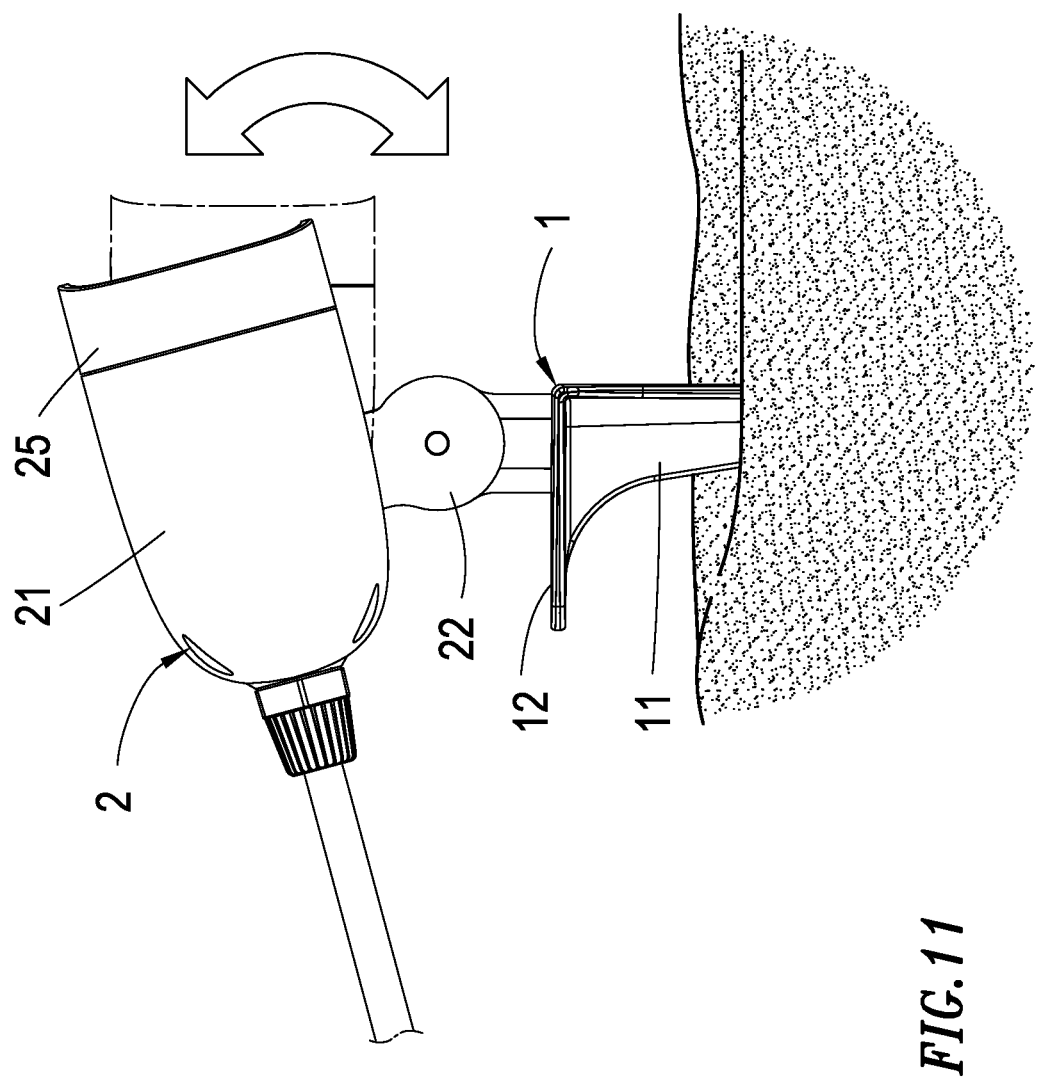
FIG. 11 shows an implementation view for angle adjustments of the multi-angle outdoor projection device according to the present invention.

In addition, referring next to FIGS. 1 and 11, it can appreciated that the multi-angle outdoor projection device according to the present invention further enables the projection angle adjustment function, which is achieved by using the direct twist angle between the first gear disc 13 and the second gear disc 22 in order to select the optimal angle for projections by the user.

The previously disclosed embodiments are merely illustrative of some preferred ones of the present invention, which are not intended to limit the scope thereof; those who are skilled in the relevant technical fields can, after understanding the technical features and embodiments of the present invention as explained hereinabove, certainly make equivalent changes, alternations or modifications without departing from the spirit and scope of the present invention, which are nonetheless deemed as falling within the coverage of the present invention; accordingly, the scope of the present invention to be protected by patent laws is subject to the definition of the claims attached to this specification.

What is claimed is:
1. A multi-angle outdoor projection device, comprising:
   a fixing frame, including a ground cone which has a treadle formed thereon, and the top of the treadle is further fixedly configured with a first gear disc having massive first gear teeth;

an exterior case, including a main case body which is fixedly configured with a second gear disc, and massive second gear teeth are formed on the second gear disc, in which the second gear disc is used to pivotally connect to the first gear disc thereby allowing the second gear teeth to closely mesh with the first gear teeth, and a combination seat is formed within the main case body having an opening, a combination groove is formed on the edge of the opening and can be applied for the assemblage of a transparent projection cover;

a projection assembly, including an electric circuit board which is assembled on the combination seat and has a lamp seat thereon, and at least two projection tubes are installed on the lateral side of the lamp seat corresponding the opening, wherein each projection tube is set up on the lamp seat perpendicularly in an outward and radial fashion such that each projection tube may project towards different directions, and each projection tube is parallel to the circuit board; wherein the electric circuit board is openly configured with plural notches whose quantity corresponds to a number of supporting frames, such that each of the supporting frames can be embedded fixedly into each of the notches in the electric circuit board.

2. The multi-angle outdoor projection device according to claim 1, wherein the second gear disc is fixedly installed under the main case body.

3. The multi-angle outdoor projection device according to claim 1, wherein the first gear teeth and the second gear teeth are ratchet teeth.

4. The multi-angle outdoor projection device according to claim 1, wherein the first gear teeth are ring-wise arranged on the first gear disc, and the second gear teeth are ring-wise arranged on the second gear disc.

5. The multi-angle outdoor projection device according to claim 1, wherein a waterproof ring is installed between the projection cover and the combination groove.

6. The multi-angle outdoor projection device according to claim 1, wherein the projection cover is separately configured with an inner cover case and an outer cover case, and the waterproof ring is located between the inner cover case and the combination groove, and the outer cover case is fixed in snap to the outside of the inner cover case.

7. The multi-angle outdoor projection device according to claim 1, wherein the inside of each projection tube is sequentially towards the outside installed with a projection lamp, a first lens, a projection film and a second lens.

8. The multi-angle outdoor projection device according to claim 1, wherein each of the supporting frames is respectively installed on the other end of each projection tube in opposition to the lamp seat, and is fixedly embedded to the electric circuit board.

* * * * *